Oct. 26, 1965  J. E. KILLPATRICK  3,214,593
COMPONENT DRIFT COMPENSATOR
Filed Aug. 28, 1961
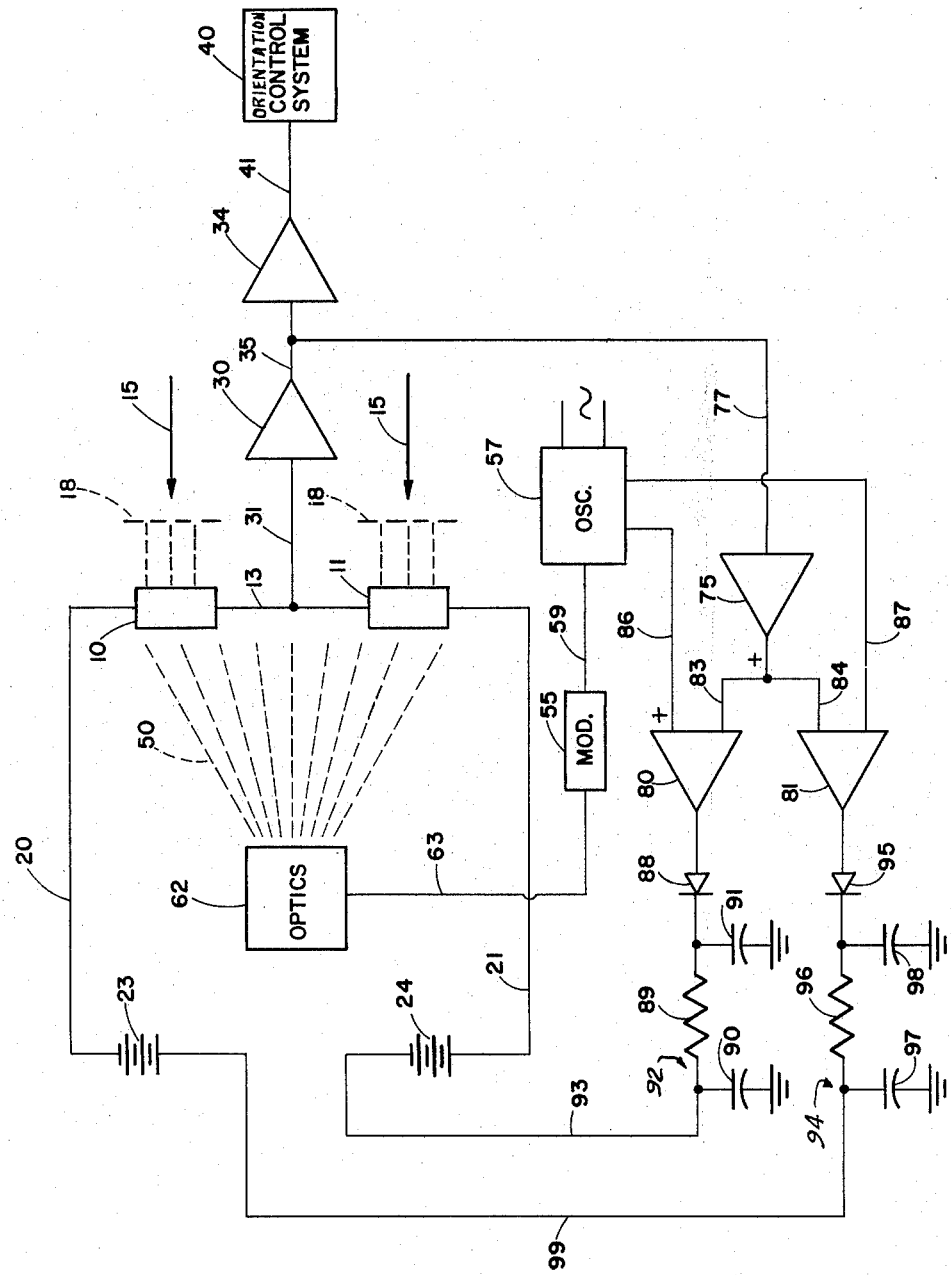
INVENTOR.
JOSEPH E. KILLPATRICK
BY Charles J. Ungemach
ATTORNEY

3,214,593
COMPONENT DRIFT COMPENSATOR
Joseph E. Killpatrick, Minneapolis, Minn., assignor to Honeywell Inc., a corporation of Delaware
Filed Aug. 28, 1961, Ser. No. 134,510
5 Claims. (Cl. 250—210)

This invention has to do with condition control apparatus and more particularly apparatus for maintaining accuracy of a circuit which is subject to drift or whose components are likely to age thereby giving false response to a condition.

In my copending application Serial No. 101,238 filed April 6, 1961, I describe apparatus for controlling the position of a body with respect to a source of radiation. In this copending application a bridge circuit is used to sense the radiation from the source and operates to produce an output whenever the orientation of the body changes with respect to the source. The radiation sensing bridge circuit of my copending application employs a pair of radiation sensitive elements or impedances such as thermistor bolometers connected in a series circuit with a pair of voltage sources. Radiation is caused to fall on the impedances in a cyclically varying manner and if the body is correctly orientated with respect to the source of radiation there is no bridge output voltage at the frequency of variation of the radiation.

This type of bridge circuitry operates successfully as long as the D.C. sources produce constant voltages and as long as the impedances do not change characteristics due to aging or the like. However, it frequently happens that one of the voltage sources gradually decays or that the impedances change characteristics thereby upsetting the balance of the bridge circuit even though the body is in the correct orientation with respect to the radiation source. The present invention has as an object the correction for this kind of drift and maintenance of an accurate bridge circuit in spite of drift or decay.

Briefly the invention comprises locating a calibration or reference source of radiation in such a manner that energy falls on the impedances from the reference source in equal quantities but at a frequency different from that applied to the impedances from the source of radiation to which the body is to be oriented. As long as the D.C. voltage sources are correct and the impedances do not change characteristics there is no output from the circuit of this standard or reference frequency. However, should the D.C. voltage sources drift or the response of radiation sensitive elements change, the resulting output of the reference frequency is utilized to add or subtract voltage from the appropriate voltage source and bring the bridge back to its correct balance. When the bridge is balanced for the calibration source it is then assured to be correctly balanced for the unknown or measured radiation.

A more complete understanding of the present invention will be obtained upon consideration of the following specification and claims taken together with the drawing in which the single figure is a schematic diagram of the circuit employing the present invention.

Referring to the figure a pair of detection or impedance elements 10 and 11 are shown connected by a conductor 13. Elements 10 and 11 are sensitive to radiation, that is, they change impedance with variations in the amount of incident radiation which may be in the visible, ultraviolet or infrared region. Specifically, when used for infrared measurements, elements 10 and 11 may be of the standard thermistor bolometer type well known in the art. Of course, other types of radiation sensitive devices may be employed and the use of the thermistor bolometres herein is merely for purposes of explaining the preferred embodiment of the invention.

As shown in the figure by arrows 15 radiation is being received from some remote source not shown. This radiation is caused to pass through a mechanical or electrical chopper shown by dash lines 18 which is oscillating at a first frequency $f_1$. The radiation is thus caused to pulsate at frequency $f_1$ before being applied to the elements 10 and 11. It is thus seen that the impedances of elements 10 and 11 vary in a periodic fashion at frequency $f_1$.

Connected to elements 10 and 11 by conductors 20 and 21 respectively are a pair of sources of direct potential which may be electronic oscillators and filter networks well known in the art but which for convenience herein as shown as batteries 23 and 24. These batteries supply a potential to elements 10 and 11 in such a manner that if their impedances are equal there is no potential at the frequency $f_1$ on conductor 13 with respect to ground or reference potential. The voltage on conductor 13 is presented to a preamplifier 30 by a conductor 31. Preamplifier 30 may be of any standard design which provides an output proportional in magnitude to a signal applied to the input. Preamplifier 30 is energized from a source of voltage (not shown). The output from preamplifier 30 is connected to an amplifier 34 by a conductor 35. Amplifier 34, like preamplifier 30 may be of any standard design which provides an output proportional in magnitude to a signal applied to the input. Amplifier 34 is likewise energized by a source of voltage (not shown). The output from amplifier 34 is connected to a control system 40 by a conductor 41. As long as the impedances of elements 10 and 11 remain substantially equal there is no voltage on conductor 13 and hence no input to preamplifier 30 and likewise no input to amplifier 34 of frequency $f_1$ and no signal to the control system 40. This condition is the normal condition indicating that the body being controlled is correctly oriented with respect to the source of radiation. However, should the body disorient itself from the desired position, more radiation is received by one of the elements 10 or 11 than by the other and an output signal of frequency $f_1$ appears on conductor 13, its phase being indicative of which of the elements is receiving the more radiation. This signal is presented to preamplifier 30 and amplifier 34 and thence to the control system 40 to cause operation of apparatus to restore the body to its correct orientation.

Normally the responsivities of elements 10 and 11 are matched so that the characteristics are substantially the same and batteries 23 and 24 are normally substantially equal. It is apparent that should battery 23 for example begin to drift then an output appears on conductor 13 even though elements 10 and 11 were receiving the same radiation. Likewise, for example, should element 10 age and change characteristics with respect to element 11 an output appears on conductor 13 even when both elements are receiving the same radiation. If such a condition were allowed to occur the control system 40 operates to reorient the body to be controlled to some orientation other than that desired and a serious malfunction in the apparatus occurs.

To overcome this problem, apparatus is employed to add or to subtract from the voltages supplied by batteries 23 and 24 in case of drift. This apparatus will now be described. As shown in the figure, further radiation shown by dash lines 50 is caused to fall on elements 10 and 11. This further radiation is obtained from a modulated energy source indicated by a block 55 which may be for example a light bulb or a hot wire energized through a conductor 59 from a conventional oscillator or multivibrator 57 operating at a second frequency $f_2$. The output of the modulated energy source is supplied to an optical system 62 through a conduit 63. The optical system 62 may be any standard lens or projection system which causes the energy from source 55 to fall on elements 10 and 11 in equal quantities but at a frequency $f_2$ different from the frequency $f_1$.

As long as batteries 23 and 24 remain equal and the characteristics of impedances 10 and 11 are unchanged there is no output on conductor 13 of frequency $f_2$ regardless of the orientation of the body. If however one of the batteries should tend to drift or the characteristics of one of the elements change there appears an output on conductor 13 of frequency $f_2$ and of phase indicative of the direction of the resulting unbalance of the bridge. This output is presented to preamplifier 30 by conductor 31 and the output of amplifier 30 is fed to a phase detection circuit which gives a D.C. output proportional in magnitude to the input signal from preamplifier 30 and of a sign or polarity which depends on the phase of the bridge output signal relative to a standard signal.

In the preferred embodiment shown, the phase detection circuit comprises an amplifier 75 connected to the output from preamplifier 30 by a conductor 77. Amplifier 75 like amplifier 34 may be of any standard design which provides an output proportional in magnitude to a signal applied to the input. Amplifier 75 is likewise energized from a source of voltage (not shown). If necessary, suitable filter networks may be employed at the inputs of amplifiers 34 and 75 to assure that they receive only $f_1$ and $f_2$ respectively. The output of amplifier 75 is connected jointly to the inputs of a pair of summing amplifiers 80 and 81 by conductors 83 and 84 respectively. Summing amplifiers 80 and 81 may be of any standard design which provides an output proportional to the sum of two inputs. Amplifiers 80 and 81 are likewise energized from sources of voltage (not shown). Summing amplifiers 80 and 81 are also connected to oscillator 57, to provide reference signals, by conductors 86 and 87 respectively in such a manner that conductor 86 has a signal thereon of phase opposite to the signal on conductor 87 although both signals are at frequency $f_2$.

As previously mentioned the output from the bridge of frequency $f_2$ is of a first or second phase depending upon the direction of unbalance. The output of amplifier 75 likewise has a first or second phase depending upon the direction of unbalance and this signal is presented to summing amplifiers 80 and 81. Assume for a moment that the bridge is unbalanced so that a signal designated as plus is presented at the output of amplifier 75. Summing amplifier 80 is connected to oscillator 57 in such a manner that a plus signal is at this instant, presented on conductor 86 while summing amplifier 81 is connected to oscillator 57 so that at this instant, a minus signal is present on conductor 87. Summing amplifier 80 then operates to increase its output due to the presence of two plus inputs while amplifier 81 operates to decrease its output due to the presence of a plus and minus input. Thus the output from summing amplifier 80 is increased while the output from summing amplifier 81 is decreased. The output from summing amplifier 80 is rectified by means of a diode 88 and smoothed by a filter circuit consisting of resistor 89 and capacitors 90 and 91. The output from the filter circuit is a direct voltage and appears on conductor 93 in series with battery 24. The output from amplifier 81 in like manner is rectified by a diode 95 and smoothed by a filter circuit consisting of resistor 96 and capacitors 97 and 98. The output from this filter circuit is also a direct voltage which appears on conductor 99 in series with battery 23. Members 88–91 comprise a first compensation element 92 and combine with battery 24 to make up a first variable voltage source. Members 95–98 comprise a second compensation element 94 and combine with battery 23 to make up a second variable voltage source.

It is seen that the increased voltage output from amplifier 80 raises the effective voltage from battery 24 while the decreased output from amplifier 81 lowers the effective voltage of battery 23. This modification of the voltages applied from batteries 23 and 24 continues until the circuit again has no voltage of frequency $f_2$ on conductor 13. At this time the circuit is balanced correctly so that the radiation received from the source as shown by arrows 15 affects elements 10 and 11 in the correct way and any output of frequency $f_1$ is indicative of disorientation of the body with respect to the source of radiation, having been connected for any drift or aging of components that may have occurred.

It is thus seen that apparatus has been provided which maintains the bridge circuit in balance with regard to drift and aging problems and maintain the circuit operable at all times. It should be understood that although operable in the preferred embodiment to sense changes of radiation the apparatus would work satisfactorily when sensing other conditions as for example temperature. Futhermore, while the energy from the source has been shown to be varied at a frequency $f_1$, it is possible under some conditions to omit the chopper 18 so that the elements 10 and 11 vary in a direct way with changes of input radiation. In other words, $f_1$ may be zero, although this mode of operation is normally less satisfactory and corrects only some of the sources of drift error. I therefore do not wish to be limited to the specific disclosures herein used but intend only to be limited by the appended claims.

I claim:

1. In combination: a balanceable network subject to drift, including a pair of detection elements, effective upon being differentially energized to vary the output of the network, and a pair of compensation elements adjustable to independently vary said output; means for subjecting said detection elements to differential energization in a first fashion from a first source so that said network gives a first output which is determined by said differential energization and by any drift in said network; independent means energizing said detection elements equally from a second source in a second fashion distinguishable from said first fashion so that said network gives a second output, distinguishable from said first output, which is zero for the normal condition of said network but which departs from zero upon the occurrence of drift in said network; and means connected to said compensation elements and to said network for adjusting said compensation elements until said second output becomes zero.

2. In combination: a balanceable network subject to drift, including a pair of detector elements, effective upon being differentially energized to vary the output of the network, and a pair of compensation elements adjustable to independently vary said output; means including a chopper operating at a first frequency for subjecting said detection elements to differential energization from a first source so that said network gives an output of said first frequency which is determined by said differential energization and by any drift in said network; independent means energizing said detection elements equally from a second source modulated at a second frequency so that said network gives a second output of said second frequency, which is zero for the normal condition of said network but which departs from zero upon the occurrence of drift in said network; and means connected to said compensation elements and to said network for adjusting said compensation elements until said second output becomes zero.

3. In combination: first and second detection elements connected in a series circuit to have a common terminal; first and second voltage sources connected in series with said circuit to comprise a balanceable network, at least one of said sources being adjustable; means, including a modulator operative at a first frequency, for subjecting said elements to irradiation which varies differentially with variation in a condition to give at said common point a first output, of said first frequency, which varies with departure of said condition from a predetermined value; independent means irradiating said elements equally at a second frequency to give at said common terminal a second output of said second frequency, which departs from zero when said network experiences drift, means responsive to said second output for varying at least one of said sources until said second signal becomes zero, and condition control means actuated in accordance with said first output.

4. In combination: first and second detection elements connected in a series circuit to have a common terminal; first and second variable voltage sources connected in series with said circuit to comprise a balanceable network; means, including a modulator operative at a first frequency, for subjecting said elements to irradiation which varies differentially with variation in a condition to give at said common point a first output, of said first frequency, which varies with departure of said condition from a predetermined value, independent means irradiating said elements equally at a second frequency to give at said common terminal a second output, of said second frequency, which departs from zero when said network experiences drift; means responsive to said second output for varying said sources until said second signal becomes zero, and condition control means actuated in accordance with said first output.

5. In combination: first and second detection elements connected in a series circuit to have a common terminal; first and second voltage sources connected in series with said circuit to comprise a balanceable network, at least one of said sources being adjustable; means, including a modulator operative at a first frequency, for subjecting said elements to irradiation which varies differentially with variation in the orientation of a body with respect to a radiating source to give at said common point a first output, of said first frequency, which varies with departure of said body from a predetermined orientation; dependent means irradiating said elements equally at a second frequency to give at said common terminal a second output, of said second frequency, which departs from zero when said network experiences drift; means responsive to said second output for varying at least one of said sources until said second signal becomes zero, and orientation control means actuated in accordance with said first output.

References Cited by the Examiner
UNITED STATES PATENTS

| | | | |
|---|---|---|---|
| 1,467,154 | 9/23 | Hammond | 250—203 |
| 1,972,221 | 9/34 | Eulenhofer | 250—220 X |
| 2,431,899 | 12/47 | Wolf et al. | 250—210 X |
| 2,548,755 | 4/51 | Vossberg et al. | 250—209 X |
| 2,583,143 | 1/52 | Glick | 250—220 X |
| 2,594,514 | 4/52 | Sweet | 250—204 X |
| 2,641,712 | 6/53 | Kircher | 250—204 |
| 2,710,559 | 6/55 | Heitmuller et al. | 250—204 X |
| 2,722,156 | 11/55 | Warren | 250—209 X |
| 3,056,885 | 10/62 | Scherbatskoy | 250—83 |
| 3,106,642 | 10/63 | Shapiro | 250—203 X |

RALPH G. NILSON, *Primary Examiner.*

WALTER STOLWEIN, *Examiner.*